Figure 5:
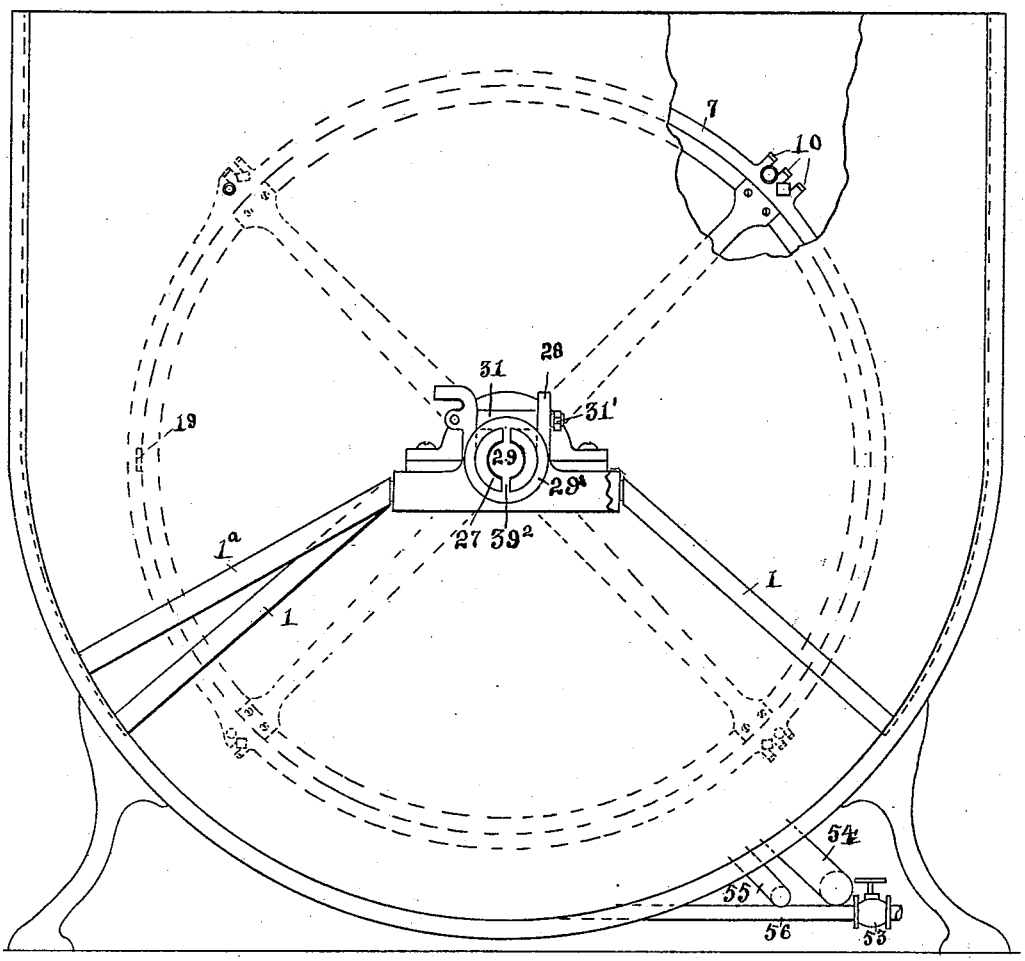

(No Model.)  T. J. THORP.  5 Sheets—Sheet 1.
WASHING MACHINE.
No. 447,520. Patented Mar. 3, 1891.
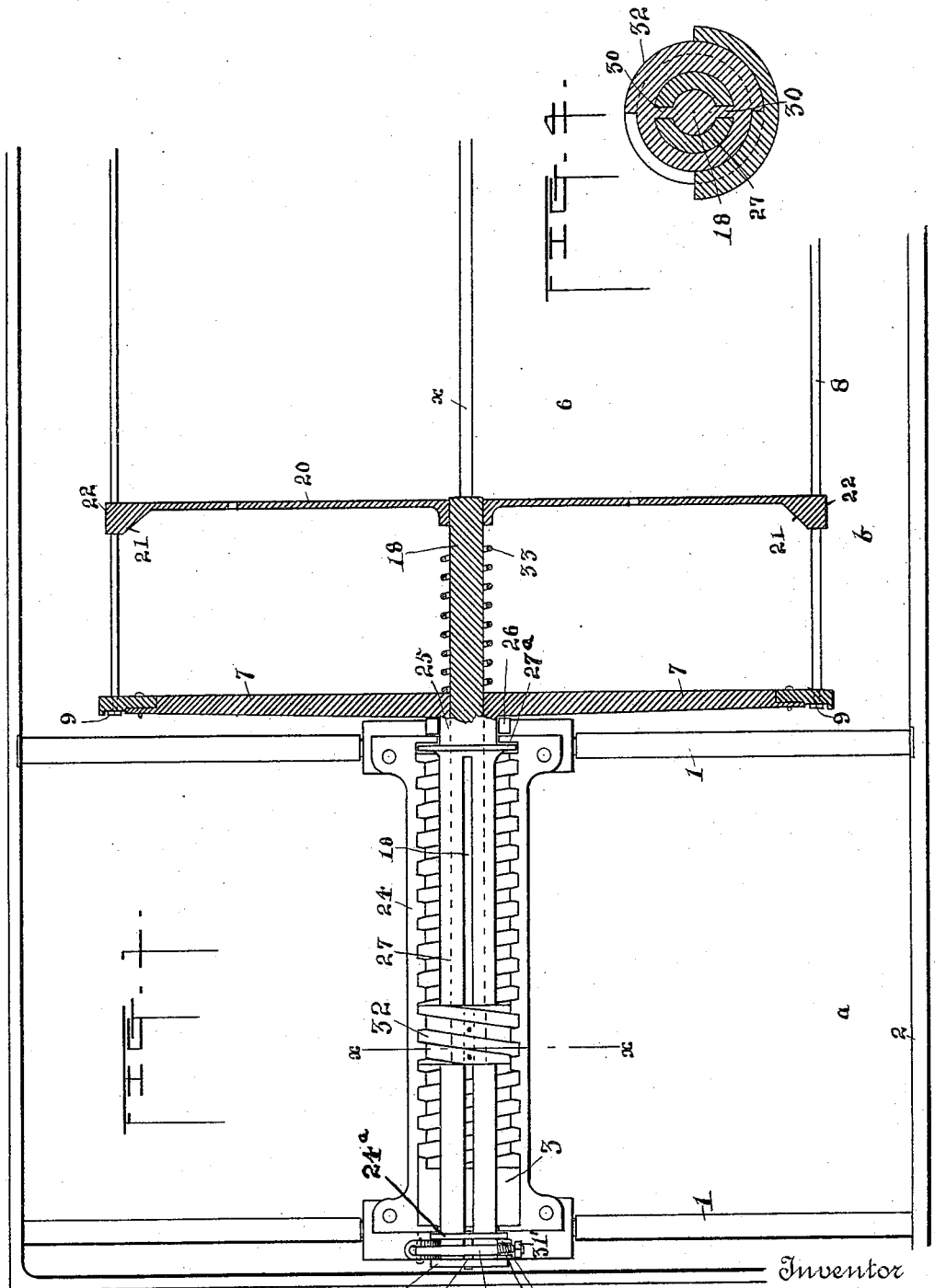
Witnesses
Arch. M. Catlin
Alfred Conover
Inventor
Thomas J. Thorp
by
Benj. R. Catlin Attorney (No Model.) 5 Sheets—Sheet 2.
T. J. THORP.
WASHING MACHINE.
No. 447,520. Patented Mar. 3, 1891.
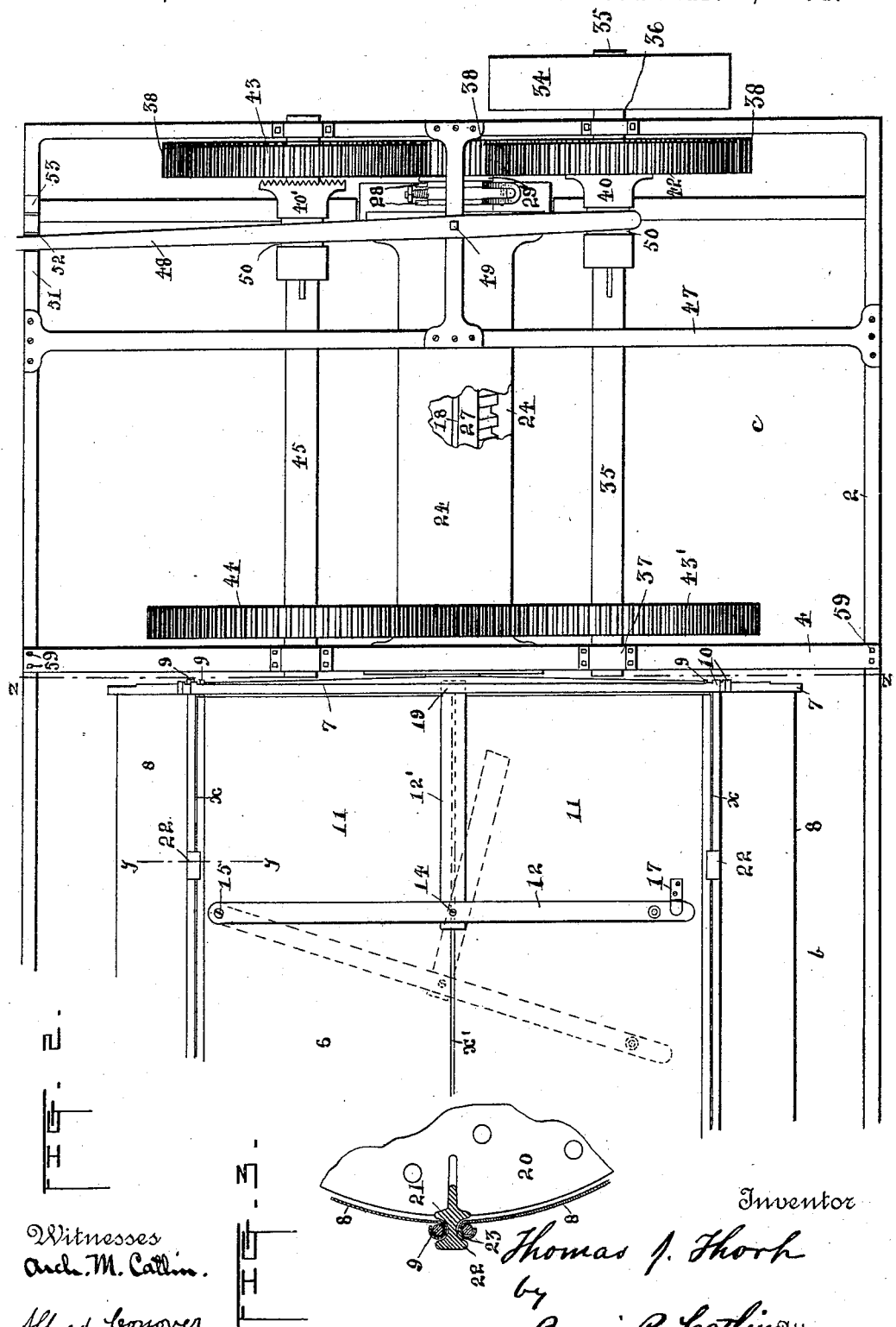
Witnesses
Arch. M. Catlin
Alfred Conover
Inventor
Thomas J. Thorp
by
Benj. R. Catlin Attorney (No Model.)

T. J. THORP.
WASHING MACHINE.

No. 447,520.    Patented Mar. 3, 1891.

(No Model.) 5 Sheets—Sheet 4.
T. J. THORP.
WASHING MACHINE.
No. 447,520. Patented Mar. 3, 1891.
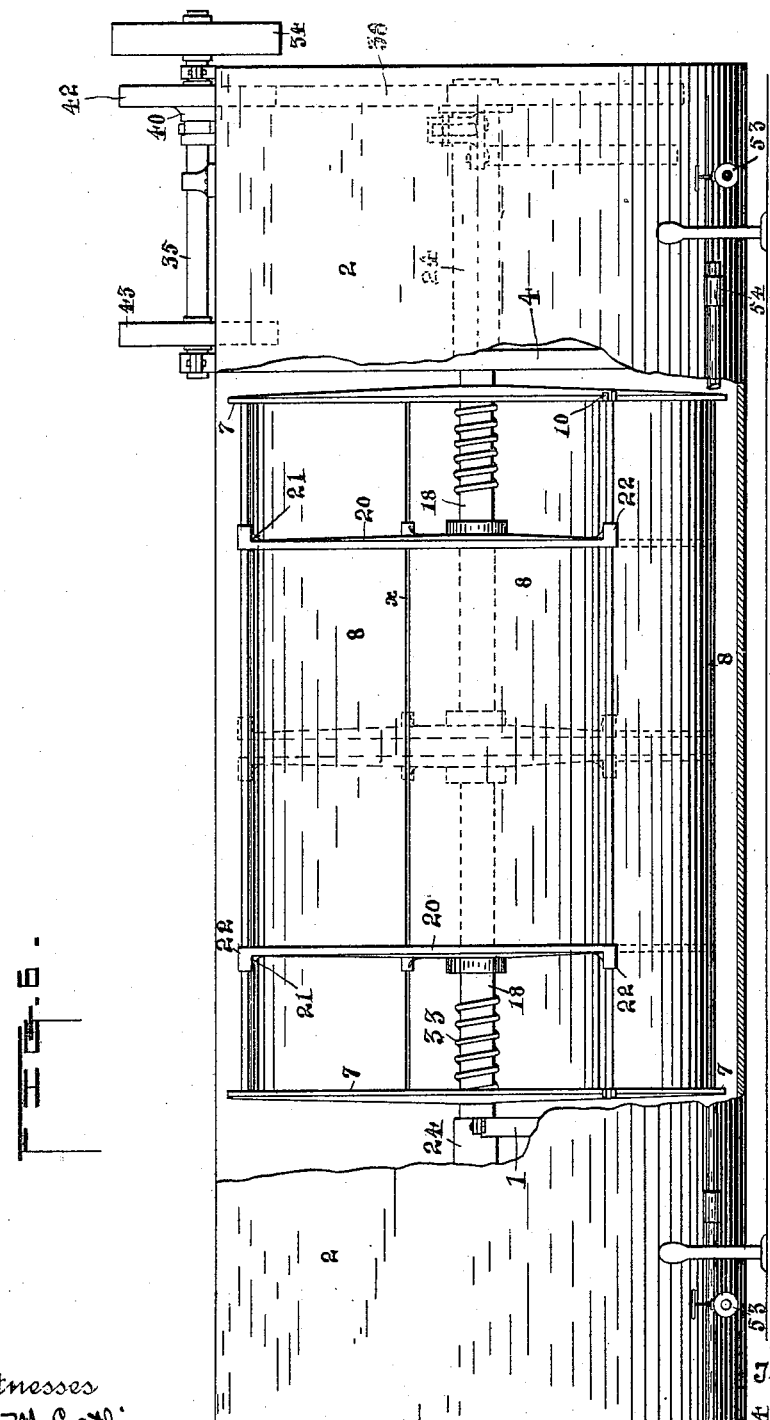
Witnesses
Arch. M. Catlin
Alfred Wood
Inventor
Thomas J. Thorp.
by
Benj. R. Catlin
Attorney (No Model.)
T. J. THORP.
WASHING MACHINE.
No. 447,520. Patented Mar. 3, 1891.
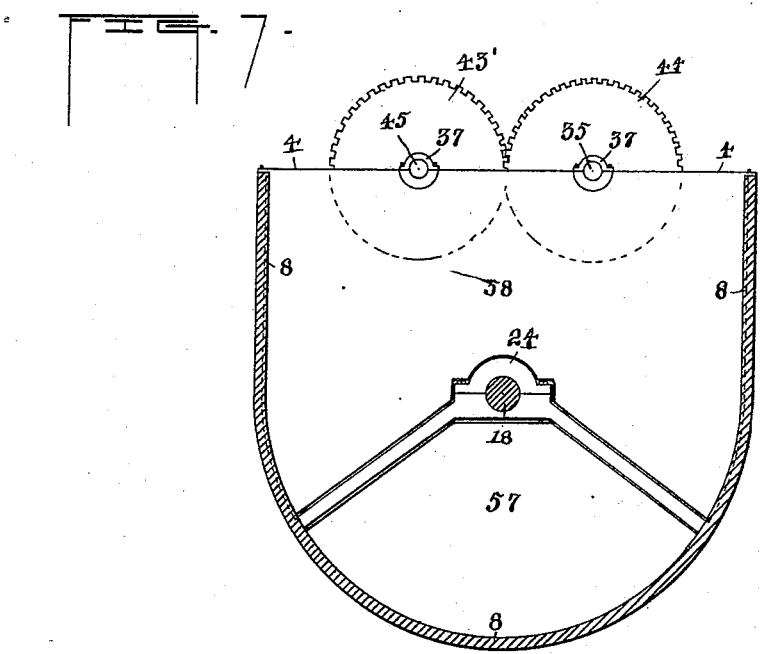
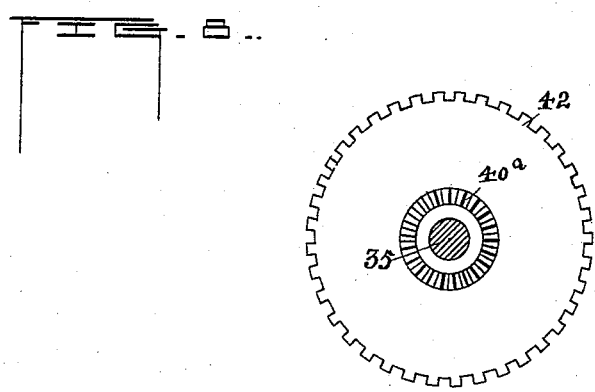

UNITED STATES PATENT OFFICE.

THOMAS J. THORP, OF CHICAGO, ILLINOIS, ASSIGNOR OF ONE-THIRD TO GEORGE N. KNEELAND, OF ROCHESTER, NEW YORK.

WASHING-MACHINE.

SPECIFICATION forming part of Letters Patent No. 447,520, dated March 3, 1891.

Application filed August 26, 1890. Serial No. 363,119. (No model.)

*To all whom it may concern:*

Be it known that I, THOMAS J. THORP, a resident of Chicago, in the county of Cook and State of Illinois, have invented certain new and useful Improvements in Washing-Machines; and I do hereby declare the following to be a full, clear, and exact description of the invention, such as will enable others skilled in the art to which it pertains to make and use the same.

The object of the invention is to provide an efficient machine for washing, rinsing, and wringing fabrics; and it consists in the matters hereinafter described and pointed out.

In the accompanying drawings, Figure 1 is a partial horizontal section. Fig. 2 is a partial plan. Fig. 3 is a transverse section on line $y\ y$ of Fig. 2. Fig. 4 is a similar view on line $x\ x$ of Fig. 1, and Fig. 5 is an end view of Fig. 1. Fig. 6 is a side elevation of the cylinder with doors removed, the tank being broken away in part. Fig. 7 is a transverse section on line $z\ z$ of Fig. 2; and Fig. 8 is a plan of a pinion, its axis being shown in section.

Numerals 1 and $1^a$ indicate struts or legs adapted to support the machine in a tank. These are arranged in pairs and may have different inclinations, as shown in Fig. 5, one of the legs $1^a$ being broken away. A pair is arranged near each end of cylinder 6. The members of each of these pairs are connected at their top and a support is thereby furnished for the journals of said cylinder.

57 indicates an approximately triangular piece which fits under each pair of legs located near the ends of the cylinder, and 58 a saddle-shaped piece which is detachably fitted to the tank and to the top of said legs 1. It is preferably fitted in grooves, as indicated in dotted lines in Fig. 5, and to be provided, if desired, with fastenings, as indicated at 59 in Figs. 2 and 6. The above-described construction provides partitions 4, which divide the tank into three compartments $a\ b\ c$, one or more of which may be provided with a water-supply pipe 54, steam-supply pipe 55, and draw-off cock 56.

6 indicates a cylinder having skeleton heads 7, said heads being composed of radial arms extending from the central hub to a rim. The peripheries of these heads are joined by curved staves or sections 8, made of sheet metal and secured to the skeleton heads by bolts 9. The edges of the sheet-metal sections are turned over these bolts, (see Fig. 3,) which are made longer than the sections and are received at their ends between lugs 10 (see Fig. 5) on the heads, and are secured thereto by nuts on the screw-threaded ends of the rods or bolts 9. The lugs are formed on the exterior rim of the heads, which heads have a diameter larger than that of the cylinder, and said lugs are so placed that the rods at the edges of the different sections will be separated by a small space $x$, as shown.

In place of one of the above-described sections, doors 11 are substituted. These doors have bolts 9, which extend through the heads and act as pivots for the doors. The metal of the doors is bent around these rods and held, together with the rods, under the heads 22 of lugs 21 on disks 20 in manner similar to that shown in Fig. 3. They are thus hinged to the adjoining sections and are locked by bars 12, one on each door. These bars are each composed of two members 12 and 12', having pivoted connections with each other at 14.

15 is a pivot connecting the circumferential member 12 to a door 11.

17 is a hook or lug adapted to receive under it the circumferential member 12 of the bar, and a recess 19, formed in the head, receives the longitudinal member 12'. When the doors are locked by swinging the bar about its pivot 15 until the curved member 12 engages the catch 17 and the straight member 12' enters the recess 19, the space $x'$ between the adjacent edges of the doors is partially covered by the straight member. In unlocking, the bar moves in the direction indicated by dotted lines. Each door supports or carries a locking-bar.

20 are perforated disks, two in number, having each a diameter about equal to the internal diameter of the cylinder. They are provided with lugs 21 having heads 22. These lugs are placed between the cylinder-sections, as shown, so that the heads 22 extend partially over the rods 9, which lie in the necks 23 of said lugs. By these means the disks are kept in position and both brace and bind the cylinder, it being especially important that it be thus held against internal pressure by said heads. They are made movable endwise of the cylinder by the means to be described.

24 are internally-threaded collars, which may either be made in sections or entire, as found convenient. They are secured upon the supporting-legs so that their axes shall be in line with the axis of the cylinder. The cylinder is provided with a journal 25 at each end, and 26 is a bearing for the same.

27 are slotted tubular shafts, which are extensions of the said journals 25.

29' is a plug or thimble having a hub or core 29 connected to the circumferential part of the plug by webs $39^2$, which fit in the ends of slots in shaft 27. The outer part of the thimble embraces the slotted shaft, and the hub or core of said thimble fits the interior of the shaft, so that its two parts are firmly held thereby, as indicated in Fig. 5.

31 is a screw-threaded hinged bolt that fits between the lugs 28, as indicated. It is locked in place over the shaft by a nut 31'.

32 is an externally-threaded sleeve or carrier connected by webs 30 with the rod 18, which is firmly secured to the disk 20. The webs extend through the slots in the hollow shaft 27 and are movable lengthwise of said shaft. The threads of the movable sleeve or carrier 32 engage those in the internally-threaded collars 24 in such manner that when the cylinder is revolved the carrier 32 is moved lengthwise of the shaft, by which means the disk is moved back and forth, according to the direction of the rotation of the cylinder.

The threads of the collar 24 are omitted at its outer end, as shown at 3, for a space a little greater than the length of carrier 32, so that the latter will be moved beyond them and become disengaged by the continued rotation of the cylinder and its hollow journal-shaft 27 in one direction, and will continue out of engagement until the direction of rotation is changed. At such time the spring 33, which is held between the disk 20 and skeleton head 7 and has been depressed by the above-described operation, will cause the carrier 32 to engage the threads of the fixed collar or sleeve 24, and the continued rotation of the cylinder will move the disks toward each other.

For domestic use the cylinder-axis may be provided with a driving-crank and handle, and in other cases it may be connected with any suitable motor. It is preferred in all cases to provide journal-bearings inside the tank, and also to provide gearing, such as illustrated, whereby openings through the end walls of the tank are avoided.

A driving-pulley is indicated at 34. Its shaft 35 has bearings at 36 and 37.

38 is a gear-wheel fast on slotted shaft 27 of the cylinder, said shaft being suitably extended beyond its flange 29 for the purpose of receiving the wheel. The sleeve 24 and the shaft 27 contained therein are supported on legs $1^a$.

40 is a sliding clutch having a key or spline connection with the shaft 35, and is adapted to engage a clutch-face $40^a$ on the pinion 42, which meshes with the wheel 38, fast on the cylinder-shaft 27. This wheel has a diameter greater than the sum of the diameters of the pinions 42 and 43, and approximately equal to the depth of the tank, the proportions between the wheel, pinions, and tank being substantially such as illustrated, so that while the wheel 38 has its axis in line with the axis of the cylinder the driving-pinions may have their journals on the upper edge of the tank, whereby the necessity of extending the axis of the main driving-wheel through the tank-wall is avoided.

40' is a clutch similar to clutch 40, and is adapted to be moved on shaft 45 into or out of engagement with a clutch-face on pinion 43. The pulley 34 and gear-wheel 43' are each fast on shaft 35. Wheel 43' meshes with gear-wheel 44, fast on shaft 45. The pinions 42 and 43 are loose upon their respective shafts.

It will be understood from the above that pulley 34 and gear 43' are driven in the same direction, and wheel 44 and pinion 43 in the opposite direction, and that the gear-wheel 38 will be driven in either direction, according as pulley 42 or 43 is clutched to its respective shaft. By this means the wheel 38 and the cylinder 6 can be revolved in either direction at will by the use of the clutch mechanism to be described.

47 indicates a frame of any suitable form supported on the tank and adapted to sustain the gearing and clutch-shifting mechanism.

48 is a clutch-lever having its fulcrum at the pivot 49 and loosely resting in the annular grooves or recesses 50, formed in the sliding clutches.

51 is a notched plate to hold the lever when adjusted.

When the lever is moved to notch 52, clutch 40 is engaged with pinion 42 and the wheel 38 and the cylinder are revolved in one direction, and when the lever is moved to notch 53 the other clutch is engaged and the wheel and cylinder are revolved in an opposite direction. Neither pinion engages wheel 38 when the lever is in the middle notch. Idle-pulleys can be dispensed with in this and other machines by this contrivance.

The above-described driving-pulley, loose gears 42 and 43, and intermediate gears 43' and 44, it will be noted, are journaled on the top of the tank-wall and of the partition 4, the main driving-gear 38 being within the tank, by which construction a hole in the exterior wall of the tank for the passage of a shaft is avoided.

Similar driving mechanism can be applied at both ends of the cylinder, and this is contemplated in machines for washing carpets and like heavy articles.

The two disks 20 having been moved toward the ends of the cylinder, clothes or other articles are placed therein and its doors securely fastened on every side. The cylinder is then rotated alternately in opposite directions, as before described, to cause the disks to first approach each other and then recede from each other, whereby the water is repeatedly pressed out of the articles. The revolution of the cylinder immersed in the water promotes its circulation and then brings comparatively clean water in contact with the dirty articles. When desired, the cylinder can be revolved, while the disks are stationary and near its ends, whereby the clothes are rinsed, clean water being supplied at suitable times for this purpose. The disks can be operated during the rinsing operation also. When rinsed, the clothes are "wrung"—that is, the water is pressed out of them—by squeezing them between the disks, the tank having been previously emptied of water. Fresh water and steam can be admitted singly or together, as required. The end compartments can be used as boiling-tanks, the steam-pipes being utilized for that purpose.

Having fully described my invention, what I claim, and desire to secure by Letters Patent, is—

1. In a washing-machine, a tank, a cylinder supported in journals within said tank, mechanism for revolving the cylinder, perforated disks or pistons in the cylinder, and devices for moving the same endwise of the cylinder, consisting of piston-rods provided with the externally-threaded sleeves, the screw-threaded bearings to receive the sleeves, and the slotted tubular cylinder-journals, the piston-rods being connected to the threaded sleeves by a web extending through the slots in the journals, and mechanism for rotating the cylinder, substantially as set forth.

2. In a washing-machine, the tank, the cylinder provided with slotted tubular journals, the disks provided with rods extending within said journals, mechanism for revolving the cylinder, and devices for moving each disk to and from its respective end of the cylinder, said devices being operated by the rotation of the cylinder, but adapted to be disengaged and left at rest by its continued rotation, substantially as set forth.

3. In a washing-machine, the tank, the cylinder provided with slotted tubular bearings, mechanism for revolving the cylinder, the disks and their rods, the externally-screw-threaded sleeves surrounding the journals and connected through their slots with the rods, and the tubes each having internal threads extended to a point having a distance from the outer end of the tube greater than the length of a sleeve, whereby when the disks have been moved to their respective ends of the cylinder by its rotation the sleeves will be disengaged from the threads of the tubes, substantially as set forth.

4. In a washing-machine, the tank, the cylinder provided with slotted tubular bearings, mechanism for revolving the cylinder, the disks and their rods, the externally-screw-threaded sleeves surrounding the journals and connected through their slots with the rods, and the tubes, each having internal threads extended to a point having a distance from the outer end of the tube greater than the length of a sleeve, and springs tending to cause the engagement of the sleeves with the internally-threaded tubes when the motion of the cylinder is reversed, whereby when the disks have been moved to their respective ends of the cylinder by its rotation the sleeves will be disengaged from the threads of the tubes and will be re-engaged upon reversing the rotation of the cylinder, substantially as set forth.

5. In a washing-machine, the tank, the slotted cylinder, and the disks provided with lugs having heads, said lugs fitting the slots and the heads extending transversely beyond the slots and bearing on the exterior of the cylinder, whereby said cylinder is supported against internal pressure, and mechanism for moving the disks endwise of the cylinder and mechanism for rotating the same, substantially as set forth.

6. In a washing-machine, the cylinder provided with the pivoted doors, the locking-bars, each having two members and pivoted to one door, a lug or keeper on the other door adapted to receive one of said members, and a recess in the cylinder-head adapted to receive the other member, substantially as set forth.

In testimony whereof I have signed this specification in the presence of two subscribing witnesses.

THOMAS J. THORP.

Witnesses:
BENJ. R. CATLIN,
ARCH. M. CATLIN.